US009425956B2

United States Patent
Vernia et al.

(10) Patent No.: US 9,425,956 B2
(45) Date of Patent: Aug. 23, 2016

(54) METHOD AND SYSTEM FOR TRANSFERRING FIRMWARE OR SOFTWARE TO A PLURALITY OF DEVICES

(75) Inventors: Filippo Vernia, La Spezia (IT); Davide Tazzari, Arezzo (IT)

(73) Assignee: ABB Technology AG, Zurich (CH)

( * ) Notice: Subject to any disclaimer, the term of this patent is extended or adjusted under 35 U.S.C. 154(b) by 0 days.

(21) Appl. No.: 14/403,720

(22) PCT Filed: May 29, 2012

(86) PCT No.: PCT/IT2012/000158
§ 371 (c)(1),
(2), (4) Date: Mar. 24, 2015

(87) PCT Pub. No.: WO2013/179316
PCT Pub. Date: Dec. 5, 2013

(65) Prior Publication Data
US 2015/0222426 A1 Aug. 6, 2015

(51) Int. Cl.
*H04L 9/08* (2006.01)
*H04L 29/06* (2006.01)
*H04L 29/08* (2006.01)

(52) U.S. Cl.
CPC .......... *H04L 9/0822* (2013.01); *H04L 63/0435* (2013.01); *H04L 67/06* (2013.01); *H04L 2209/60* (2013.01)

(58) Field of Classification Search
CPC . H04L 9/0822; H04L 63/0435; H04L 67/06; H04L 2209/60
See application file for complete search history.

(56) References Cited

U.S. PATENT DOCUMENTS

| | | | | |
|---|---|---|---|---|
| 6,993,137 | B2 * | 1/2006 | Fransdonk | G06F 21/10 380/259 |
| 2002/0147906 | A1 * | 10/2002 | Lotspiech | H04L 12/18 713/158 |
| 2003/0228018 | A1 * | 12/2003 | Vince | H04N 7/1675 380/277 |
| 2004/0059939 | A1 * | 3/2004 | de Jong | G06F 21/10 726/28 |

(Continued)

FOREIGN PATENT DOCUMENTS

| WO | 2005059776 | 6/2005 |
|---|---|---|
| WO | 2009074941 | 6/2009 |

OTHER PUBLICATIONS

Wang et al., Internet-based Management and Consumption of Digital Assets, Feb. 2011, 2011 World Congress on Internet Security, pp. 49-53.*

(Continued)

*Primary Examiner* — Kenneth Chang
(74) *Attorney, Agent, or Firm* — Patterson Intellectual Property Law, P.C.; Mark J. Patterson; Gary L. Montle (57) ABSTRACT

A method for transmitting a file from a file source (101) to a plurality of electronic devices (110*j*) is described herein. To each electronic device are associated an encryption key and a unique identifier code. According to the method described herein, to the plurality of electronic devices are transmitted: a file encrypted by means of a session key, and a plurality of encrypted session keys, each paired with a respective electronic device, with whose encryption key the respective encrypted session key was obtained; Moreover, each electronic device decrypts its own encrypted session key using the respective encryption key to obtain the decrypted session key, and decrypts the encrypted file by means of the decrypted session key.

14 Claims, 2 Drawing Sheets

(56) References Cited

U.S. PATENT DOCUMENTS

| | | |
|---|---|---|
| 2004/0243814 A1 | 12/2004 | Nakano et al. |
| 2006/0177067 A1* | 8/2006 | Kim .................. H04L 9/0822 380/278 |
| 2006/0233376 A1* | 10/2006 | Forsberg ............. H04L 63/04 380/277 |
| 2009/0089569 A1* | 4/2009 | Baribault ............ G06F 15/16 713/2 |
| 2009/0180617 A1* | 7/2009 | Peterka .............. H04L 9/083 380/277 |
| 2011/0299685 A1* | 12/2011 | Hall ................ H04L 9/0822 380/273 |

OTHER PUBLICATIONS

European Patent Office: International Search Report for PCT/IT2012/000158, dated Jul. 3, 2013.

* cited by examiner

Fig.1

STATE OF THE ART

METHOD AND SYSTEM FOR TRANSFERRING FIRMWARE OR SOFTWARE TO A PLURALITY OF DEVICES

TECHNICAL FIELD

The present invention relates to methods and systems for secure transmission of electronic files, e.g. files containing or constituted by firmware or software.

BACKGROUND

A multiplicity of electronic devices for consumers and for professional use are provided with software necessary for their operations. Such software is typically installed by the manufacturer in protected areas of the device, to prevent them from being downloaded and copied. Commonly, programs installed within electronic devices are known as firmware.

The performance of an electronic device depends to a large extent on the installed firmware or software. The same devices can be provided with ever more advanced software or firmware, both to eliminate the flaws of previous releases of the software, and to carry out new functions, or improve existing functions.

Today, technology enables easily to update the programs (software and firmware) on electronic devices once they are installed by the customer. All this is now considered a given fact and above all a "must-have" item by any type of customer, whether it be a large company or a home user of a given electronic apparatus or device. Consider how it is now commonplace to update one's CD reader, video games console, home router with new firmware supplied from time to time by the manufacturer of the device. For operating systems and application software, e.g. programs for word processing, video and image processing, electronic publishing, accounting and other purposes, continuous updates and advances are available, which are also offered online to the owners of the respective electronic devices that use them, e.g. computers, mobile telephones and others.

For security and marketing reasons, device manufacturers need to protect their product while still enabling users to update the purchased product remotely, through the new software or firmware as it becomes available.

Normally, the channel, or in general the path followed by a new software update from the time it leaves the enterprise to the time it reaches its intended recipient is neither protected nor secure. For this reason, enterprises try to protect their firmware or software by encrypting it, using suitable encryption algorithms for the purpose.

Recently, customized software or firmware update technique has been introduced. According to this technique, the software manufacturer adopts suitable measures to ensure that an updated firmware or software can only be sent to a single device. When the supplier or manufacturer of the software or firmware adopts an approach of this kind, the updated software or firmware must be received, e.g. by downloading it from the Internet, once for each device to be updated. Situations of this kind are typically experienced, for example, in the case of a plurality of computers connected to a company network. Each computer must download the software or firmware update, e.g. the update of the operating system or of an application. In such a case, the same update must be downloaded through the Internet connection as many times as there are computers connected to the local network.

There are many techniques to carry out this process of individually upgrading each device. For example, the update can be controlled using a different encryption code for each device to be updated. Otherwise, hardware or software keys to be applied to the device may be provided; they may be made in such a way that they can only interface with one specific device. In this case, for example, the hardware key may be fitted with a microcontroller to read data or codes of the device with which the key is interfaced the first time, and to prevent the key from operating if it is connected to a different device.

If the update of a software or of a firmware, i.e. of a generic program on an electronic device, for security and data protection reasons is carried out with a technique that requires sending a different software for each electronic apparatus or device, high costs will be incurred in terms of data processing or of transmission bandwidth utilization.

For example, let it be supposed that an installation has a plurality of electronic devices, which must be updated, and a collection point that connects them to a data center able to provide the software updates to be installed on individual devices. An installation of this kind may comprise a photovoltaic farm, in which each panel is associated with an electronic device that exchanges information with a data collection unit. The data collection unit is manufactured and programmed to collect information about the proper operation of individual panels by interrogating the electronic devices on the panels and to communicate with a remote-operation or supervision center. A similar situation can be represented by a public lighting system, comprising a plurality of light fixtures, each of which can be associated to an electronic device, e.g. able to verify the proper operation of the light fixture, and/or to command it to be turned on and off and/or to dim it. The electronic devices of the individual light fixtures can be connected, e.g. through a power line communication system, with a data collection unit, which dialogs with the individual electronic devices. The collection unit, in turn, can be connected with a remote-operation or supervision center, to which the data collected by the unit are transmitted, and/or which can send commands or queries to the individual electronic devices.

In a scenario of this kind, every time it becomes necessary to update the software or firmware on the electronic devices, the collection unit must receive the same software or firmware from the remote-control or supervision center as many times as there are devices to be updated and said software or firmware must be encrypted every time with an encryption key for each device. Supposing that the installation comprises N identical devices to be updated, in practice the control unit would have to download N times the same update only because it is physically encrypted in a different way for each device. This is a problem in itself, because it requires the transmission of a large quantity of data.

Moreover, since the electronic devices are typically connected to a bus, or to another shared transmission communication channel, said bus is utilized to communicate all the N programs to the various devices, remaining occupied a long time to perform this function. If the firmware or software were single, the control unit could download the firmware of software only once and transmit it to all the electronic devices also in broadcast mode at once, i.e. transmitting it only once on the bus or other transmission channel.

The primary function of the control unit is to monitor and manage the electronic devices connected to it, and the communication bus has to be occupied mainly for monitoring and signaling and for the management of the operating problems of the controlled electronic devices. From this viewpoint, a remote update can be considered a secondary functionality, to which the least possible amount of time and resources should be dedicated. This requirement is in contrast with the need to transmit the updated software as many times as there are devices: such a need is determined by the need to transmit the software or firmware under secure conditions.

Figure 1:
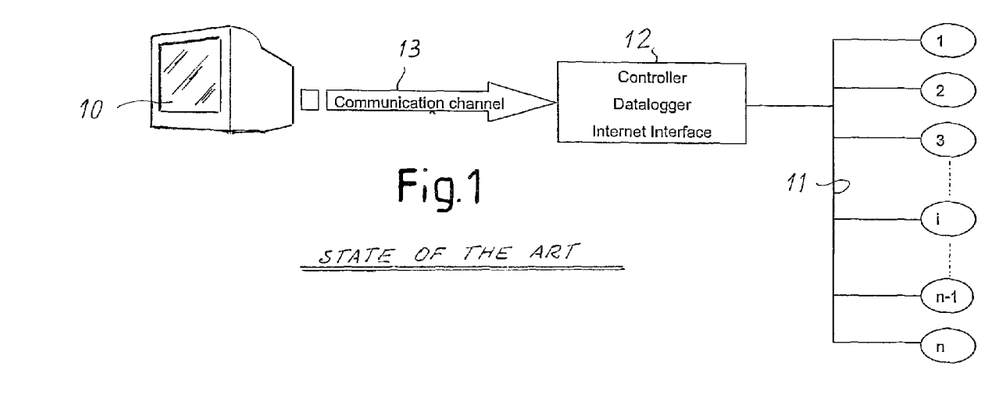
FIG. 1 shows a diagram of files or programs transmission from a server to a plurality of devices according to the prior art.

FIG. 1 shows a diagram of a system according to the prior art. The reference number 10 indicates a data center, e.g. a server, used, among other purposes, to contain the upgrading files (e.g. firmware) of a plurality of devices 1, 2, . . . i, . . . n−1, n, which are connected to a transmission bus 11. The bus 11 in turn is connected to a block 12 which represents a controller, a datalogger and an interface and a generic transmission channel 13, which connects it to the server, e.g. the Internet. For data protection reasons, the files are transmitted from the server 10 to the controller 12 in encrypted form. If C is the chosen encryption algorithm and Fw the firmware in clear to be encrypted, the size of the encrypted firmware will be equal to or greater than the original firmware. Typically, on a firmware of large size, the size increase of the file as a consequence of encryption is nearly negligible. For example, with the 128-bit AES algorithm (http://it.wikipedia.orq/wiki/Advanced_Encryption_Standard), the size of the encrypted object is a multiple of 128 bits, i.e. 16 bytes. Hence, if the original firmware is 10 bytes, the result will be 16 bytes. If instead the firmware is 15000 bytes, the result will be 15008 (first multiple of 16 subsequent to 15000). Therefore, for large numbers, the unencrypted firmware and the encrypted firmware have comparable size. Therefore, it can be considered that $$\text{Dim}(F_w) = D \cong \text{Dim}(C(F_w, K_j)) = D_{CF} \quad (1)$$

where
Dim(Fw) is the size of the unencrypted file (firmware);
Dim(C(Fw, $K_j$) is the size of the encrypted file (firmware);
$K_j$=f(RND$_j$, . . . ) is the encryption key, which by way of example may be represented by a one-directional function of a string of bits, a part of which is represented by a random number RND$_j$. This number is different for each $j^{th}$ device, since each encrypted firmware is intended for one specific device and not for the others.

Hence, encryption does not substantially change the size of the firmware to be transferred.

Let $W_C$ be the weight in bytes of a data exchange on the communication channel between server 10 and controller and let $W_B$ be the weight in bytes of a data exchange on the bus 11 between controller 12 and each device 1 . . . n. With the transmission technique according to the state of the art, in which each $j^{th}$ device receives a firmware encrypted with its own $K_j$ encryption key, the traffic in bytes $T_C$ on the communication channel 13 shall be equal to $$T_c = \Sigma_{i=1}^n (D_{CF} + W_C) = n(D_{CF} + W_C) \quad (2)$$

Similarly, the traffic in bytes TB on the internal bus 11 will be $$T_B = \Sigma_{i=1}^n (D_{CF} + W_B) = n(D_{CF} + W_B) \quad (3)$$

It must be taken into consideration that the workload of each $j^{th}$ device will not only be the one necessary for the update, but also the one required to process and discard all (n−1) update communications received by the other devices connected to the bus. Typically, since the channel 11 is a shared bus, all devices 1 . . . n "listen" to the entire communication regardless of whether it is addressed to them or not.

SUMMARY OF THE INVENTION

To reduce the cost of the update of a plurality of devices through new files, i.e. software or firmware programs, while assuring data security, the same file, intended for each of n devices, is encrypted with a single dedicated encryption key, hereafter also called "session key". The encrypted file can be transmitted securely even on an unprotected channel, because if it is intercepted, it is still impossible to obtain the unencrypted file by anyone who does not know either the encryption algorithm used, or above all the encryption key. Together with the encrypted file, the session key is transmitted as well. However, the session key is not transmitted in the clear, because otherwise data protection would be lost. In turn, it is encrypted. To make it possible for the file to be correctly decrypted and hence used by a plurality of devices, the session key is encrypted a number of times equal to the number of devices that have to receive the file, obtaining a plurality of encrypted session keys. Each encrypted session key is obtained applying an encryption algorithm to the session key, using a different encryption key each time for each device for which the update file is intended. More specifically, to each electronic device is associated an encryption key, which can be, for example, generated by the device itself as a function of a pre-stored random number. This number is known only to the electronic device 5 and to the system that generates the encrypted files to be transmitted, hereafter also called "file source". In this way, each electronic device will be able to decrypt the encrypted session key applying the reverse algorithm, i.e. the decryption algorithm, using its own encryption key generated starting from the information residing in a protected area of its own memory. Among the plurality of encrypted session keys, which are transmitted together with the encrypted file, the individual electronic device is able to recognize its own encrypted session key, i.e. the session key encrypted with its own encryption key, e.g. providing for each encrypted session key to be associated to a unique identifier code of the electronic device, with whose encryption key the encrypted session key was obtained. The unique identifier code is known not only to the electronic device, but also to the file source, which is able to associate to each encrypted session key the unique identifier code, which enables the electronic device to recognize which of the various encrypted session keys is the one that matches it.

Therefore, according to one aspect, the invention provides a method for the transmission of a file from a file source to a plurality of electronic devices, to each electronic device an encryption key (e.g. generated or generable by a random number attributed to the electronic device or by other data attributed to the device) and a unique identifier code being associated, wherein:

to each electronic device are transmitted a file encrypted by means of a session key, and a plurality of encrypted session keys, each paired with a respective electronic device, with whose encryption key the respective encrypted session key was obtained;

and wherein each electronic device decrypts its own encrypted session key using the respective encryption key, to obtain the decrypted session key, and decrypts the encrypted file by means of the decrypted session key.

An "associated" encryption key, i.e. paired with the device, is generically understood to mean an encryption key matching the electronic device. It can be constituted by a random number attributed to the electronic device, or it can be obtained as a function from one or more random numbers attributed to the electronic device.

According to one embodiment, the method comprises the steps of:

- storing, in a memory accessible by said file source, and for each electronic device: data associated with the encryption key of the respective electronic device and the unique identifier code of the respective electronic device, paired with each other;
- generating said session key;
- encrypting the file to be transmitted through an encryption algorithm using said session key, thus generating said encrypted file;
- for each electronic device, encrypting the session key with the encryption key of the electronic device, obtaining said plurality of encrypted session keys;
- transmitting, to each of said electronic devices, said encrypted file and said plurality of encrypted session keys, each paired with the respective unique identifier code of the respective electronic device, with whose encryption key the encrypted session key was obtained;
- in each of said electronic devices: identifying the respective encrypted session key associated with the unique identifier code of the electronic device; decrypting the encrypted session key by means of the encryption key of the electronic device, to obtain the decrypted session key; decrypting the encrypted file by means of the decrypted session key.

According to a further aspect, a system for transmitting a file to a plurality of electronic devices is provided, wherein to each of said electronic devices are associated: at least one unique identifier code; and data for defining a respective encryption key. The system comprises: a file source; a plurality of electronic devices; at least one data transmission channel from said file source to said electronic devices. Advantageously, the file source is programmed to generate: a file encrypted by means of a session key; and a plurality of encrypted session keys, each obtained by encrypting the session key with the encryption key of a respective one of said electronic devices. Advantageously, each electronic device is programmed to: decrypt its own encrypted session key using its own encryption key, to obtain the decrypted session key; and to decrypt the encrypted file by means of the decrypted session key.

The system can advantageously comprise a memory, accessibly by the file source, in which are stored the data that define the encryption keys, each paired with the unique identifier code of the matching electronic device.

In some embodiments, the file source is programmed to generate a session key not correlated to the encryption keys of the electronic devices. Moreover, advantageously the file source can be programmed: to create, from a session key, a list of encrypted session keys, each of which is encrypted by means of a respective encryption key of one of the electronic devices to which the file is to be transmitted; to pair in said list each encrypted session key with the unique identifier code of the electronic device, through whose encryption key the session key was encrypted; and to transmit said list and said encrypted file to the electronic devices.

Herein and in the appended claims, the term "file" means a set of digital information that constitutes for example and specifically a software or firmware program, or more in general any other set of digitalized information, e.g. a string or set of data representing a real or virtual entity. In particular, a file is a sequence of instructions executable by a microcontroller or by a microprocessor. The term "file source" means a system of hardware and software built and programmed for transmitting files. The term "encryption key" of an electronic device means an encryption key, usable by an encryption algorithm to encrypt a file, derived from a data item that is attributed, i.e. associated, to the respective device. This data item can be represented, advantageously, by a respective random number associated to each electronic device. Preferably, the encryption keys of the various devices of a system are mutually different. The term "unique identifier code" of an electronic device means a code, e.g. consisting of a binary number, which uniquely identifies said electronic device. The term "encrypted file" means a file obtained from another file applying an encryption algorithm and at least one encryption key. The term "session key" means an encryption key used to encrypt a file to be transmitted from one point to another of a generic system. The term "encrypted session key" means a key obtained from a session key applying an encryption algorithm and at least one encryption key to the session key. The term "shared transmission channel" means any channel through which it is possible to transmit information intended for one or more electronic devices connected to said channel, possibly in "broadcasting" mode. A shared channel can be a bus, a power line communication channel, a radio channel or another type of channel.

Features and embodiments are described herein below and further defined in the appended claims, which are an integral part of the present description. The above brief description identifies features of the various embodiments of the present invention in such a way that the present detailed description may be better understood and that the present contributions to the art may be better appreciated. Obviously, there are other features of the invention which shall be described further on and which shall be delineated in the appended claims. With reference to this, before illustrating different embodiments of the invention in detail, it must be understood that the various embodiments of the invention are not limited in their application to the construction details and to the arrangements of components described herein or illustrated in the drawings. The invention can have other embodiments and implemented and put in practice in various ways. Furthermore, it must be understood that the phraseology and the terminology used herein are solely for description purposes and must not be construed as limiting.

Those skilled in the art therefore will understand that the concept whereon the description is based can be readily used as a basis to design other structures, other methods and/or other systems to achieve the various purposes of the present invention. Hence, it is important that claims be deemed comprehensive of those equivalent constructions that do not depart from the spirit and from the scope of the present invention.

BRIEF DESCRIPTION OF THE DRAWINGS

A more complete comprehension of the illustrated embodiments of the invention and of the many advantages achieved shall be obtained when the aforesaid invention is better understood with reference to the detailed description that follows in combination with the accompanying drawings, wherein.

DETAILED DESCRIPTION OF AN EMBODIMENT

The detailed description of exemplifying embodiments that follows refers to the accompanying drawings. The same reference numbers in different drawings identify identical or similar elements. Moreover, the drawings are not necessarily to scale. Additionally, the detailed description that follows does not limit the invention. Rather, the scope of the invention is defined by the appended claims.

Throughout the description, reference to "an embodiment" or "the embodiment" or "some embodiments" means that a particular feature, structure or element described in relation to one embodiment is included in at least one embodiment of the described object. Therefore, the sentence "in an embodiment" or "in the embodiment" or "in some embodiments" in various points along the description does not necessarily refer to the same embodiment or embodiments. Additionally, the specific features, structures or elements can be combined in any suitable way in one or more embodiments.

Hereafter, the method is described with reference to a system wherein the transmission of the files takes place through a transmission channel that enables the transmission from the file source to a controller, which then transmits the data to the individual electronic devices that are the recipients of the files through a shared channel, e.g. a shared bus, preferably in "broadcasting" mode. In other, less advantageous embodiments, the transmission can take place directly from the file source to the individual electronic devices.

Figure 2:
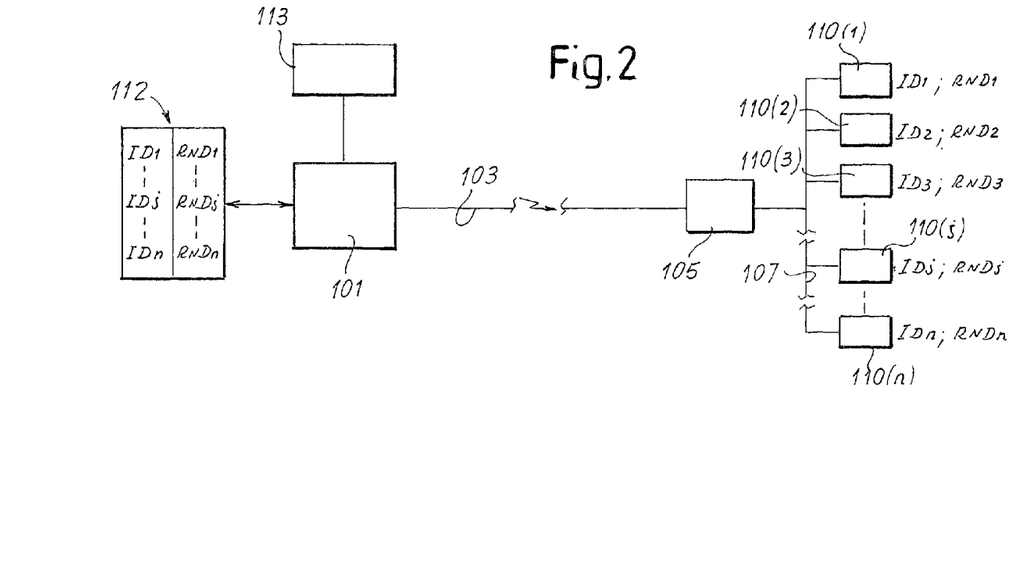
FIG. 2 shows a diagram of files or programs transmission of from a file source to a plurality of devices according to the method described herein.

FIG. 2 shows schematically and in the form of a block diagram a system for the transmission of files, such as software or firmware, from a file source 101 to a plurality of devices. The reference number 103 indicates a generic transmission channel. The transmission channel can be any channel, e.g. the Internet. In the illustrated embodiment, to the transmission channel 103 is interfaced a controller 105. This controller receives the data transmitted on the transmission channel 103 and transfers them, through a shared channel, e.g. a shared bus, generically indicated by the reference number 107, to a plurality of electronic devices 110(1), 110(2), . . . 110(j) . . . 110(n). Hereafter, 110 generically indicates any one of said electronic devices, or the set of electronic devices.

For the purposes of the present invention, the type of apparatus that constitutes the source of files 101 is irrelevant. It can comprise any hardware and/or software architecture or structure that is able to perform the functions described below. The transmission channel 103 can also be any channel. For the purposes of this description, both the physical means of data propagation, and the protocol utilized, the bit rate, etc. are irrelevant. Also irrelevant is whether the transmission channel is protected or unprotected. Hereafter, it will be assumed that the channel is unprotected, i.e. intrinsically non-secure, and hence that it is necessary to transmit the data in encrypted form for security reasons.

The electronic device 110 can be of any type whatsoever. What matters is only that it has at least one microcontroller or microprocessor and that it is able, e.g. through a bootloader, to perform the operations and carry out the functions that will be described below.

Each electronic device 110 is associated to at least one unique identifier code ID. In the diagram of FIG. 2, $ID_j$ indicates the generic unique identifier code of the electronic device 110(j). The unique identifier code ID can be defined by a sequence of binary digits. Hereafter $D_{ID}$ indicates the size in bytes of the unique identifier code of a generic electronic device 110.

Moreover, to each electronic device 110 is associated a random number $RND_j$. The random number $RND_j$ (possibly in combination with other parameters) is used to generate a password or encryption key $K_j$ usable in combination with a generic encryption algorithm C, for the purposes that will be clarified further on. In some simpler embodiments, the encryption key $K_j$ of the device 110(j) consists of the random number $RND_j$ itself. The random number $RND_j$ has no correlation with the unique identifier code $ID_j$ of the respective electronic device 110j. This means that it is impossible to obtain, from the unique identifier code $ID_j$ of the $j^{th}$ electronic device 110, the encryption key $K_j$ or the number $RND_j$ associated thereto.

The data $ID_j$ and $RND_j$ are advantageously stored in a protected and inaccessible memory of the respective electronic device 110(j).

The bootloader of each device 110 is advantageously able to receive files, in particular firmware or software, e.g. for updates. Moreover, the bootloader is conveniently able to decrypt said file through a known algorithm, i.e. it is able to decrypt a file that is transmitted in encrypted format. Advantageously, the file source 101 is associated to a memory 112 in which can be stored the unique identifier codes $ID_1$, $ID_2$, . . . $ID_j$ . . . $ID_n$ of the electronic devices 110(1), 110(2), . . . 110(j) . . . 1110(n) to which the file source 101 can be requested to send files. To each unique identifier code $ID_j$ of the generic electronic device 110(j), in the memory 112 is paired the data item from which the encryption key is obtained. In the illustrated example, this data item is the respective random number $RND_j$ of the device 110(j) identified by the identifier number IDj. In practice, then, in the memory 112 can be stored data pairs ($ID_j$; RNDj), with j variable from 1 to n, where n is the total number of electronic devices that can receive encrypted files from the file source 101.

In the diagram of FIG. 2 a block 113 is also indicated, which represents an archive of files, e.g. software or firmware that the file source 101 can send to the electronic devices 110. The file source 101 is programmed to encrypt the files through a generic encryption algorithm C.

The method used to transfer data, e.g. firmware or software, to the individual electronic devices 110 will now be described with specific reference to the case of transmission of the same program (i.e. a software or a firmware or more in general any file to be transferred to multiple devices), e.g. an updated version of an application, to all electronic devices 110. It must be understood that the method can also be used to update only some of the electronic devices 110.

Figure 3:
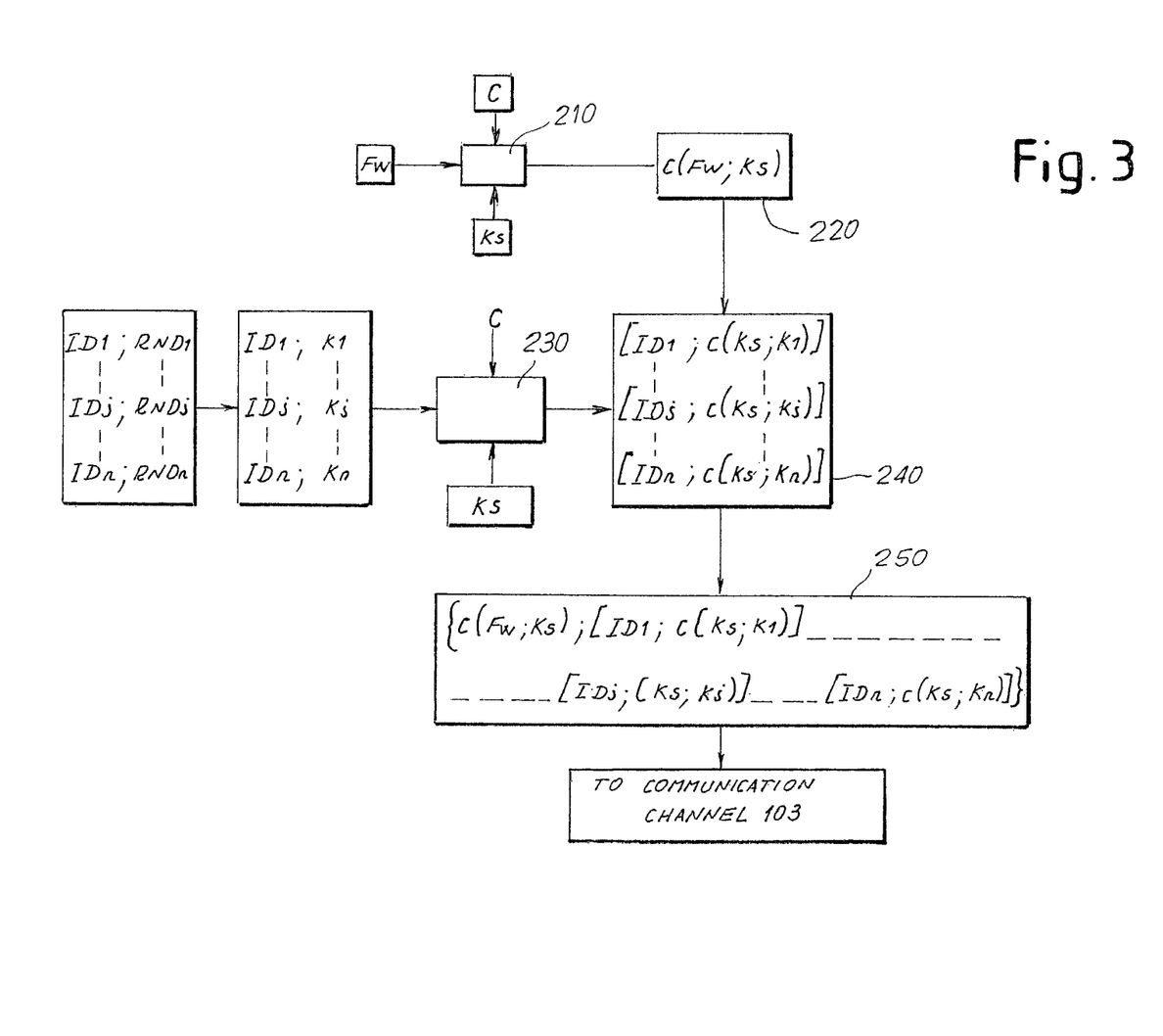
FIG. 3 shows a block diagram of the operations performed by the file source.

The method is shown schematically in the block diagram of FIG. 3. The reference Fw indicates a generic program, e.g. a firmware to be encrypted. The first step consists of encrypting the program FW through a generic encryption algorithm C and an encryption key. The encryption key, or password, hereafter indicated as $K_s$, can be generated randomly for each file encryption and transmission session, i.e. every time a file must be transmitted to one or more devices 110(j). Hereafter, the encryption key Ks is called "session key". The block 210 of FIG. 3 represents schematically the step of encrypting the firmware Fw through the algorithm C and the session key $K_s$. From the encryption, an encrypted firmware indicated by C(Fw, $K_s$) is obtained (block 220).

Using an encryption algorithm, which can be the same encryption algorithm C, and the encryption keys $K_j$ of each electronic device $110(j)$, as many encrypted session keys are then generated as are the electronic devices 110 that have to receive the encrypted software or firmware. In the illustrated example, the encryption keys $K_j$ of the individual devices are obtained starting from the random numbers $RND_j$ stored in the memory 112, each number $RND_j$ being associated to a respective electronic device $110(j)$. In other words, $K_j$=f$(RND_j)$. The memory 112 also contains, for each electronic device $110(j)$, the respective unique identifier code $ID_j$, paired with the matching random number $RND_j$. The operation of encrypting the session key $K_s$ is represented schematically by the block 230. Each session key $K_s$ encrypted with the encryption key $K_j$ of the generic electronic device $110(j)$ is indicated by $C(K_s, K_j)$, see block 240 in FIG. 3, and it is called "encrypted session key". Since in the memory 112 to each random number $RND_j$ is associated the unique identifier code $ID_j$ of the respective $j$-$^{th}$ electronic device 110 to which the file must be transmitted, each encrypted session key $C(K_s, K_j)$ is again paired with the unique identifier code $ID_j$ of the respective $j$-$^{th}$ electronic device, whose encryption key $K_j$=f$(RND_j)$ was used to generate the encrypted session key $C(K_s, K_j)$, as shown in the block 240. The unique identifier code $ID_j$ is not encrypted and it is transmitted in the clear.

As shown schematically in the subsequent block 250, for a generic session of transmission of a generic firmware Fw, on the transmission channel 103 the following are then transmitted:

the firmware Fw encrypted with the session key $K_s$: C(Fw, $K_s$)

a list containing all the pairs formed by unique identifier code $ID_j$ and related encrypted session key, encrypted with the matching encryption key $K_j$ of the generic device $110(j)$: [$IC_j$; $C(K_s, K_j)$]. The list contains as many pairs as are the electronic devices to be updated.

This data flow can be transmitted on the channel 103, which is unprotected and hence intrinsically non-secure. The only data in the clear are the unique identifier codes $ID_j$. These are altogether uncorrelated with respect to the encryption keys $K_j$ of the electronic devices 110 and to the session key $K_s$. The remaining data (session key $K_s$ and firmware Fw) are transmitted in encrypted version. Without knowing the encryption keys $K_j$ of the electronic devices and the session key $K_s$, it is impossible to decrypt the encrypted firmware Fw.

The controller 105 receives this data stream and transmits it, for example in broadcasting mode, on the shared bus 107. All the electronic devices $110(1) \ldots 110(n)$ read the same data flow. Each electronic device to which the firmware is addressed identifies its own unique identifier code $ID_j$ in the data stream and hence it can extract from the data stream the session key encrypted with its own encryption key $K_j$, i.e. the data item that in the diagram of FIG. 3 is indicated as $C(K_s, K_j)$. Since the encryption key $K_j$ of the electronic device $110(j)$, or the random number $RND_j$ from which the encryption key $K_j$ is to be obtained, is stored by the bootloader in a protected area of the device, the bootloader of the electronic device is able to decrypt the session key, using the decryption algorithm $C^{-1}$, obtaining the session key $K_s$ in the clear:

$$K_s = C^{-1}(C(K_s, K_j), K_j) \quad (4)$$

where $C^{-1}$ is the decryption function or algorithm corresponding to the encryption function or algorithm C used to encrypt the session key. The generic device $110(j)$ at this point is able, applying the decryption algorithm $C^{-1}$ again, to extract the clear version of the firmware Fw through the session key $K_s$ and to install it in the electronic device:

$$F_W = C^{-1}(C(F_W, K_S), K_S) \quad (5)$$

Hence, it was possible to transmit the encrypted file only once for a number n, which can be very high, of electronic devices to be updated. To do so, together with the encrypted firmware, a sequence of n encrypted session keys was transmitted with the respective unique identifier codes, which enable the individual electronic devices to decrypt the firmware.

Hereafter, it is demonstrated that the size of the data to be transmitted, i.e. the required data traffic, is far smaller than would be required to transmit n times the file Fw encrypted each time with the encryption key of the individual device for which the firmware is intended.

Using the same encryption algorithm. C, the size of the resulting firmware encrypted with the session key $K_s$ is the same as the firmware resulting from encryption with the encryption key $K_j$ of the individual device $110(j)$. The size of the encrypted file is $$\text{Dim}(FW) = D \cong \text{Dim}(C(FW, K_j)) = \text{Dim}(C(FW, K_S)) = D_{CF} \quad (6)$$

The size of each encrypted session key is $$\text{Dim}(C(KS, K_j)) = D_P \quad (7)$$

and clearly it will be equal for every encryption key $K_j$ of every electronic device, because the dimensions of the $K_j$ are the same and the encryption algorithm remains the same.

Hence, the traffic in bytes $T_C$ on the communication channel will be $$T'_C = \overline{\underset{\text{Ciphered firmware}}{(D_{CF} + W_C)}} + \underbrace{\left(\sum_{i=1}^{n}(D_{ID} + D_P) + W_C\right)}_{\text{List of ciphered keys}} = \quad (8)$$

$$D_{CF} + n(D_{ID} + D_P) + 2W_C$$

where $D_{ID}$ is the size in bytes of the unique identifier code of each electronic device 110. As defined in the introductory part, $W_C$ is the weight in bytes of a data exchange on the communication channel 103 between the file source 101 and the controller 105. Subsequently, the controller 105 will provide the encrypted firmware, the unique identifier codes and the encrypted session keys to the electronic devices $110(j)$ through the shared bus 107 in broadcast mode. The traffic in bytes $T_B'$ on the shared bus 107 will be given by $$T'_{BC} = \overline{\underset{\text{Ciphered firmware}}{(D_{CF} + W_B)}} + \underbrace{\left(\sum_{i=1}^{n}(D_{ID} + D_P) + W_B\right)}_{\text{List of password ciphered}} = \quad (9)$$

$$D_{CF} + n(D_{ID} + D_P) + 2W_B$$

where $W_B$ is the weight in bytes of a data exchange on the shared bus 107.

These traffic data must now be compared with those that would be had in case of a transmission according to the prior art, in which the same encrypted file or firmware is transmitted as many times as are the electronic devices for which it is intended, encrypted each time with the encryption key of the recipient electronic device.

To determine the traffic on the server-controller communication channel, the following assumptions are made:
the encrypted firmware is 32K, i.e. 32786 byte
the size of the unique identifier code is 16 byte
the size of the encrypted session key or password is 16 byte The traffic on the transmission channel 103 expressed in byte will be $$T_C = n(D_{CF} + W_C) = nD_{CF} + nW_C = 32786 \cdot n + nW_C \quad (10)$$

according to the prior art method; instead $$T'_C = D_{CF} + n(D_{ID} + D_P) + 2W_C = 32786 + n(16+16) + 2W_C \quad (11)$$

using the method described herein. The update of only two electronic devices 110 will now be considered. The two values $T_C$ and $T'_C$ will be:

$$T_C = n(D_{CF} + W_C) = nD_{CF} + nW_C = 32786 \cdot n + nW_C = 32786 \cdot 2 + 2W_C = 65536 + 2W_C \quad (12)$$

$$T'_C = D_{CF} + n(D_{ID} + D_P) + 2W_C = 32786 + n(16+16) + 2W_C = 32786 + 2 \cdot 32 + 2W_C = 32850 + 2W_C \quad (13)$$

Hence, even with just 2 electronic devices the weight of almost an entire firmware is saved and thus an equivalent bandwidth and computational time is saved. If there are ten devices to be updated, the values indicated above become:

$$T_C = n(D_{CF} + W_C) = nD_{CF} + nW_C = 32786 \cdot n + nW_C = 32786 \cdot 10 + 10W_C = 327860 + 10W_C \quad (14)$$

and $$T'_C = D_{CF} + n(D_{ID} + D_P) + 2W_C = 32786 + n(16+16) + 2W_C = 32786 + 10 \cdot 32 + 2W_C = 33106 + 2W_C \quad (15)$$

Similarly, the same saving is obtained at the side of the shared bus 107 with the addition that the devices would also save the computational load of receiving and discarding the firmware that is not for them at the cost of the search for their own encryption key in a list and in an additional decryption step.

Let the unreal assumption be made that the weight of the communication on the communication channel 103 is zero, i.e. $W_C = 0$. Since in the prior art this weight is added for each transaction, this analysis still yields a worse result from the viewpoint of the new method described herein.

$$\left. \frac{T'_C}{T_C} \right|_{W_C=0, n=2} = \frac{32850}{65536} = 0.50125122 \cong \frac{1}{2}(50\%) \quad (16)$$

$$\left. \frac{T'_C}{T_C} \right|_{W_C=0, n=10} = \frac{33106}{327860} = 0.100976 \cong \frac{1}{10}(10\%) \quad (17)$$

As is readily apparent, the improvement that is obtained tends to be proportional to the number of electronic devices to be updated.

For a number of electronic devices tending to infinity, one has $$\lim_{n\to\infty} \left. \frac{T'_C}{T_C} \right|_{W_C=0} = \lim_{n\to\infty} \frac{D_{CF} + n(D_{ID} + D_P)}{nD_{CF}} =$$

$$\lim_{n\to\infty} \underbrace{\frac{D_{CF}}{nD_{CF}}}_{\text{firmware}} + \lim_{n\to\infty} \overbrace{\frac{n(D_{ID} + D_P)}{nD_{CF}}}^{\text{session key}} = \lim_{n\to\infty} \underbrace{\frac{1}{n}}_{=0} + \quad (18)$$

-continued $$\frac{(D_{ID} + D_P)}{D_{CF}} = \frac{(D_{ID} + D_P)}{D_{CF}}$$

This result leads to the following conclusions on the new approach versus the prior art:
the higher the number of electronic devices to be updated, the more negligible the weight of the individual firmware will be
the larger the firmware, the more the weight of the size of the password or encryption key and of the unique identifier code of the individual electronic device is negligible.

Ultimately, the method described herein is highly effective to make efficient the transfer of an update firmware or software or of a generic file encrypted/encoded individually for a plurality of devices. This technique enables
to maintain intact the security of the update as it is conceived by the manufacturing firm,
to optimize the data exchange,
to obtain a drastic improvement with regard to the data exchange, the data management time and the bandwidth occupation,
to increase performance as the number of electronic devices to be updated increases,
to minimize the computational load of the electronic devices that are no longer flooded by a myriad very large updates of no interest to them,
to improve utilization of the shared bus by returning it to its primary use, i.e. monitoring and controlling the electronic devices, preventing it from being overloaded in case of updates,
to improve utilization of the server-controller communication channel, minimizing traffic. It should also be consider that, oftentimes, this is a costly channel and the cost is typically based on traffic or on connection time (e.g., GPRS).

These advantages are obtained in exchange for a minimal load increase, consisting of:
adding a decryption process by the device: retrieval of the session key
receiving and processing the list of the encrypted session keys In the above description, it was assumed that data are transmitted from a file source to a controller, through a generic transmission channel 103, and from the transmission channel to the individual electronic devices, through a shared bus 107. At least some of the advantages listed are also maintained if the transmission takes place directly from the file source to the individual electronic devices, which can be connected directly to the file source 101 through the communication channel 103. In this case, it may be necessary to send the encrypted file, e.g. the encrypted firmware, as many times as are the electronic devices to be updated. However, the advantage of having to encrypt the firmware only once is obtained.

The embodiments described above and illustrated in the drawings have been discussed in detail as examples of practical implementations of the invention. Those skilled in the art will understand that many modifications, variations, additions and omissions are possible, without departing from the principles, from the concepts and from the teachings of the present invention as it is defined in appended claims. Therefore, the scope of the invention must be determined solely according to the broadest interpretation of the appended claims, including therein said modifications, variations, additions and omissions, variations, additions and omissions. The terms "comprise" and derivatives thereof do not exclude the presence of additional elements or steps beyond those specifically listed in a given claim. The term "one" or "a" or "an" that precedes an element, means or feature of a claim does not exclude the presence of a plurality of these elements, means or features. When a device claim lists a plurality of "means", some or all such "means" may be embodied by a single component, member or structure. The enunciation of determined elements, features or means in distinct dependent claims does not exclude the possibility of mutually combining said elements, features or means. When a method claim lists a sequence of steps, the sequence in which said steps are listed is not binding, and it can be modified, if the particular sequence is not indicated as binding. Any reference numerals in the appended claims are provided to facilitate reading of the claims with reference to the description and to the drawing, and do not limit the scope of protection represented by the claims.

The invention claimed is:

1. A method for transmitting a file from a file source to a plurality of electronic devices, wherein an encryption key and a unique identifier code are associated with each electronic device, the method comprising:
   for each transmission of a file from the file source,
      generating a session key,
      encrypting a file using the session key, and
      transmitting the encrypted file
      and a plurality of encrypted session keys in a single transmission via a communication channel to each the plurality of electronic devices, wherein each of the encrypted session keys is paired with a respective unique identifier code of a respective one of the electronic devices, and wherein each of the encrypted session keys is generated using a respective encryption key associated with the respective electronic device;
      each electronic device selecting the encrypted session key paired to the unique identifier code of the respective electronic device and decrypting the encrypted session key paired with the unique identifier code of the respective electronic device using the respective encryption key, to obtain a respective decrypted session key; and
      decrypting the encrypted file in each electronic device using the respective decrypted session key.

2. The method of claim 1, wherein the file source generates the encrypted session keys and combines to each encrypted session key the unique identifier code matching the encryption key used to obtain the encrypted session key using data stored in the memory.

3. The method of claim 1, wherein:
   the file source transmits the encrypted file and the plurality of encrypted session keys to a controller; and
   the controller transmits the encrypted file and the plurality of encrypted session keys to the plurality of electronic devices.

4. The method of claim 2, wherein:
   the file source transmits the encrypted file and the plurality of encrypted session keys to a controller; and
   the controller transmits the encrypted file and the plurality of encrypted session keys to the plurality of electronic devices.

5. The method of claim 3, wherein the controller transmits the encrypted file and the plurality of encrypted session keys to the plurality of electronic devices through a shared transmission channel.

6. The method of claim 4, wherein the controller transmits the encrypted file and the plurality of encrypted session keys to the plurality of electronic devices through a shared transmission channel.

7. A system for transmitting a file to a plurality of electronic devices, wherein each of the electronic devices includes an associated unique identifier code and an encryption key, the system comprising:
   a file source;
   a plurality of electronic devices;
   at least one communication channel for transmitting data from the file source to the electronic devices;
   wherein the file source is configured to generate a file encrypted by a session key and a plurality of encrypted session keys, each of the encrypted session keys obtained by encrypting the session key with a respective encryption key of a respective one of the electronic devices and paired with a respective unique identifier code of a respective one of the electronic devices;
   wherein the file source is further configured for each generated file to transmit the encrypted file and the corresponding plurality of encrypted session keys in a single transmission via a communication channel to the plurality of electronic devices; and wherein each electronic device is configured to select the encrypted session key paired to the unique identifier code of the respective electronic device and decrypt the selected encrypted session key using the respective encryption key of the electronic device, to obtain a respective decrypted session key; and to decrypt the encrypted file using the decrypted session key.

8. The system of claim 7, further comprising a memory unit accessibly by the file source, the memory unit storing data to obtain the encryption keys of the electronic devices, each paired with the unique identifier code of a corresponding electronic device.

9. The system of claim 7, wherein the file source is further configured to generate a session key that is not correlated to the encryption keys of the electronic devices.

10. The system of claim 8, wherein the file source is further configured to generate a session key that is not correlated to the encryption keys of the electronic devices.

11. The system of claim 9, wherein the file source is further configured to:
   create, from a session key, a session key list of encrypted session keys, each of which is encrypted using a respective encryption key of one of the electronic devices;
   pair in the session key list each encrypted session key with the unique identifier code of the electronic device, by which encryption key the session key was encrypted; and
   transmit the session key list and the encrypted file to the electronic devices.

12. The system according to claim 10, wherein the file source is further configured to: create, from a session key, a session key list of encrypted session keys, each of which is encrypted using a respective encryption key of one of the electronic devices;
   pair in the session key list each encrypted session key with the unique identifier code of the electronic device, by which encryption key the session key was encrypted; and transmit the session key list and the encrypted file to the electronic devices.

13. The system of claim 7, wherein each of the electronic devices comprises a boot loader.

14. The system of claim 7, further comprising:
a communication channel configured to transmit the file source to a controller; and
a shared channel coupling the controller to the electronic devices.

* * * * *